P. LULL.
Removing Hides from Animals.
No. 76,642.          Patented April 14, 1868.
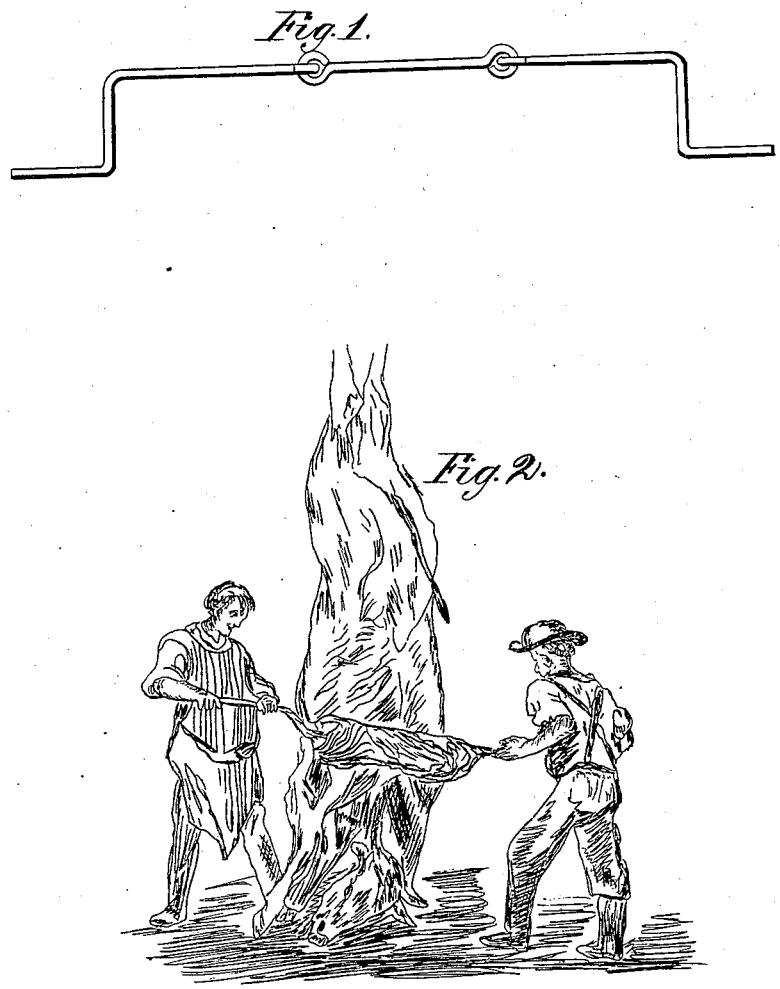

United States Patent Office.

PHILO LULL, OF NORWICH, NEW YORK.

Letters Patent No. 76,642, dated April 14, 1868.

---

IMPROVEMENT IN APPARATUS FOR REMOVING HIDES FROM ANIMALS.

---

The Schedule referred to in these Letters Patent and making part of the same.

---

TO ALL WHOM IT MAY CONCERN:

Be it known that I, PHILO LULL, of Norwich, in the county of Chenango, and State of New York, have invented a certain new and useful Improvement in the Apparatus used for Removing Hides from Animals; and I do hereby declare that the following is a full and exact description thereof, reference being had to the accompanying drawings, making a part of this specification, in which—

Figure 1 is a view of my improved apparatus, and

Figure 2 shows the method of removing hides by its use.

This device is designed to facilitate the heretofore tedious process of skinning animals, and greatly lessens the use of the knife, with its injury to the hide. Its simplicity of construction and cheapness are a sufficient guarantee of its general use.

To enable those skilled in the arts to make and use my invention, I will describe its construction and use, as follows, viz:

For the ordinary use of the farmer, I take a rod of half-inch round iron, and form a crank upon one end, and an eye or hook upon the other, two of which, when connected by the eye and hook, or an intermediate link, form a shaft, with a crank at either end, and constitute the entire device.

The above is intended for skinning small animals, such as the calf, sheep, &c., but when the hides are to be removed from larger ones, it will be necessary to increase the size of the iron. The length of the rod is to be determined by the kind of work required.

To use this improvement, the usual cutting, slitting, and starting are required, after which the rod is placed across the animal, and the end of the hide wrapped around it, when, by turning the cranks at each end, the hide will be drawn from the animal and neatly rolled around the rod.

The particular advantages which this device possesses over others are—

First. Simplicity of construction, cheapness, and durability.

Second. By its use, the operator is enabled to remove the hide more easily than by any other method.

Third. By rolling the hide around the rod, with the hair inside, it keeps the hair and dirt from the carcass, of the animal.

Fourth. It saves much use of the knife, and thereby lessens the risk of injury to the hide by cutting.

What I claim as my invention, and desire to secure by Letters Patent, is—

The rod or its equivalent, constructed and operated for the purpose and substantially as herein set forth.

PHILO LULL.

Witnesses:
 DANIEL E. TEAL,
 JONATHAN WELLS.